US012712118B2

(12) United States Patent
Jung et al.

(10) Patent No.: US 12,712,118 B2
(45) Date of Patent: Aug. 18, 2026

(54) COIL COMPONENT

(71) Applicant: SAMSUNG ELECTRO-MECHANICS CO., LTD., Suwon-si (KR)

(72) Inventors: Do Young Jung, Suwon-si (KR); Kang Wook Bong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 847 days.

(21) Appl. No.: 17/985,352

(22) Filed: Nov. 11, 2022

(65) Prior Publication Data

US 2023/0178291 A1 Jun. 8, 2023

(30) Foreign Application Priority Data

Dec. 6, 2021 (KR) ........................ 10-2021-0172769

(51) Int. Cl.
*H01F 27/29* (2006.01)
*H01F 27/24* (2006.01)
*H01F 27/32* (2006.01)

(52) U.S. Cl.
CPC ............. *H01F 27/29* (2013.01); *H01F 27/24* (2013.01); *H01F 27/32* (2013.01)

(58) Field of Classification Search
CPC ......... H01F 27/2804; H01F 2027/2809; H01F 17/0006; H01F 17/0013; H01F 5/003; H01F 27/29; H01F 27/292

(Continued)

(56) References Cited

U.S. PATENT DOCUMENTS 7,327,207 B2 * 2/2008 Asakawa ................. H01G 4/40 336/200
2008/0197963 A1 * 8/2008 Muto .................. H01F 17/0013 336/200

(Continued)

FOREIGN PATENT DOCUMENTS

JP 2007-067214 A 3/2007
KR 10-2019-0035435 A 4/2019

(Continued)

OTHER PUBLICATIONS

Office Action issued on Aug. 12, 2025 in the corresponding Korean Patent Application No. 10-2021-0172769 with English translation.

*Primary Examiner* — Tszfung J Chan
(74) *Attorney, Agent, or Firm* — Morgan, Lewis & Bockius LLP

(57) ABSTRACT

A coil component includes: a body including a magnetic material; a substrate disposed in the body; a coil unit including first and second coil patterns disposed on both surfaces of the substrate, respectively, first and second via pads connected to inner ends of the first and second coil patterns, respectively, and a via connecting the first and second via pads to each other; and first and second external electrodes disposed to be spaced apart from each other on the body, while respectively being connected to the coil unit, wherein the first and second via pads include connection portions connected to the first and second coil patterns, respectively, and wing portions protruding from both side surfaces of the connection portions, and each of the first and second via pads has substantially the same or smaller line width than each of the first and second coil patterns.

28 Claims, 7 Drawing Sheets

(58) Field of Classification Search
USPC .................................................. 336/200, 232
See application file for complete search history.

(56) References Cited

U.S. PATENT DOCUMENTS

| | | | | |
|---|---|---|---|---|
| 2014/0022041 | A1* | 1/2014 | Park | H01F 5/00 336/199 |
| 2016/0284463 | A1* | 9/2016 | Moriyama | H01F 17/0013 |
| 2017/0047160 | A1* | 2/2017 | Kim | H01F 41/046 |
| 2018/0358171 | A1* | 12/2018 | Jung | H01F 17/0013 |
| 2019/0088407 | A1 | 3/2019 | Jung et al. | |
| 2019/0096564 | A1* | 3/2019 | Park | H01F 17/0013 |
| 2020/0143976 | A1* | 5/2020 | Jeon | H01F 1/26 |
| 2020/0219645 | A1* | 7/2020 | Jeong | H01F 41/041 |
| 2020/0286671 | A1* | 9/2020 | Kim | H01F 17/04 |

FOREIGN PATENT DOCUMENTS

| | | | |
|---|---|---|---|
| KR | 10-2019-0065991 | A | 6/2019 |
| KR | 10-1987213 | B1 | 6/2019 |
| KR | 10-2004807 | B1 | 10/2019 |
| KR | 10-2145308 | B1 | 8/2020 |

* cited by examiner

COIL COMPONENT

CROSS-REFERENCE TO RELATED APPLICATION(S)

This application claims benefit of priority to Korean Patent Application No. 10-2021-0172769 filed on Dec. 6, 2021 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in an electronic device together with a resistor and a capacitor.

As electronic devices are increasingly improved in performance while their sizes become smaller, the number of electronic components used in the electronic devices has increased, and the sizes of the electronic components have decreased.

Meanwhile, a thin film type power inductor having a small size includes a via for electrical connection between coil layers. In order to ensure alignment between the via and the coil, a via pad may be formed to have a wider line width than an innermost end of a coil pattern. However, there is a problem that the via pad having a wider line width than the coil pattern may cause excessive plating, and in this case, it may be difficult to sufficiently secure an area of a core portion.

SUMMARY

An aspect of the present disclosure may provide a coil component having improved inductance characteristics by minimizing an area occupied by via pads while having improved connection reliability between the via pads and a via.

According to an aspect of the present disclosure, a coil component may include: a body including a magnetic material; a substrate disposed in the body; a coil unit including first and second coil patterns disposed on both surfaces of the substrate, respectively, first and second via pads connected to inner ends of the first and second coil patterns, respectively, and a via connecting the first and second via pads to each other; and first and second external electrodes disposed to be spaced apart from each other on the body, while respectively being connected to the coil unit, wherein the first and second via pads include connection portions connected to the first and second coil patterns, respectively, and wing portions protruding from both side surfaces of the connection portions, and each of the first and second via pads has substantially the same or smaller line width than each of the first and second coil patterns.

According to an aspect of the present disclosure, a coil component may include: a body including a magnetic material; a substrate disposed in the body; and a coil unit including first and second coil patterns disposed on both surfaces of the substrate, respectively, first and second via pads connected to inner ends of the first and second coil patterns, respectively, the first and second via pads include connection portions extending from innermost ends of the first and second coil patterns, respectively, in a direction toward the center of the first and second coil patterns, and wing portions protruding from both side surfaces of the connection portions, and a via connecting the first and second via pads to each other.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
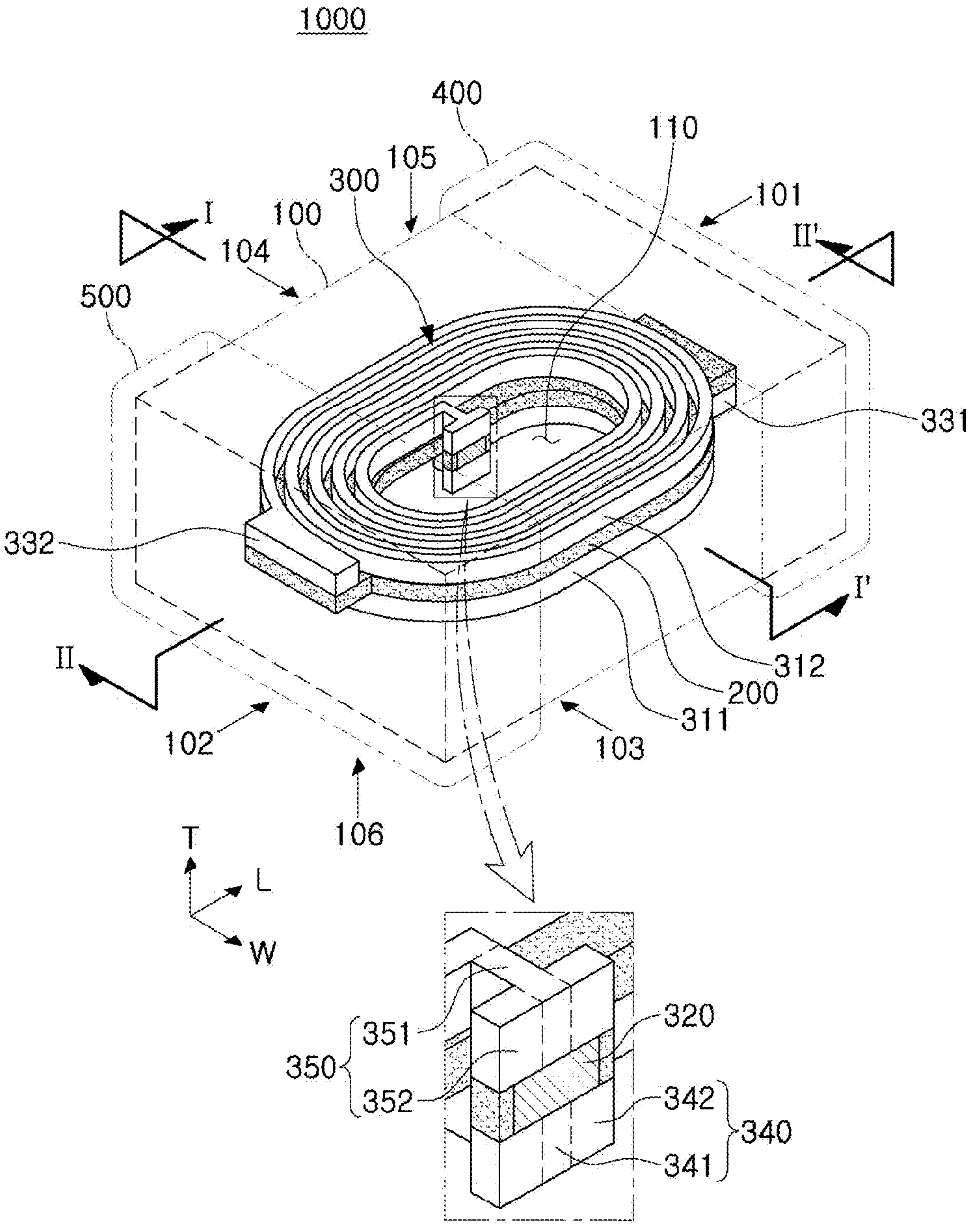
FIG. 1 is a schematic perspective view illustrating a coil component according to a first exemplary embodiment in the present disclosure.

Hereinafter, exemplary embodiments in the present disclosure will now be described in detail with reference to the accompanying drawings.

In the drawings, an L direction may be defined as a first direction or a length direction, a W direction may be defined as a second direction or a width direction, and a T direction may be defined as a third direction or a thickness direction.

Various kinds of electronic components may be used in electronic devices, and various kinds of coil components may be appropriately used between these electronic components to remove noise or for other purposes.

That is, in the electronic devices, the coil components may be used as power inductors, high frequency (HF) inductors, general beads, high frequency (GHz) beads, common mode filters, and the like.

First Exemplary Embodiment

Figure 2:
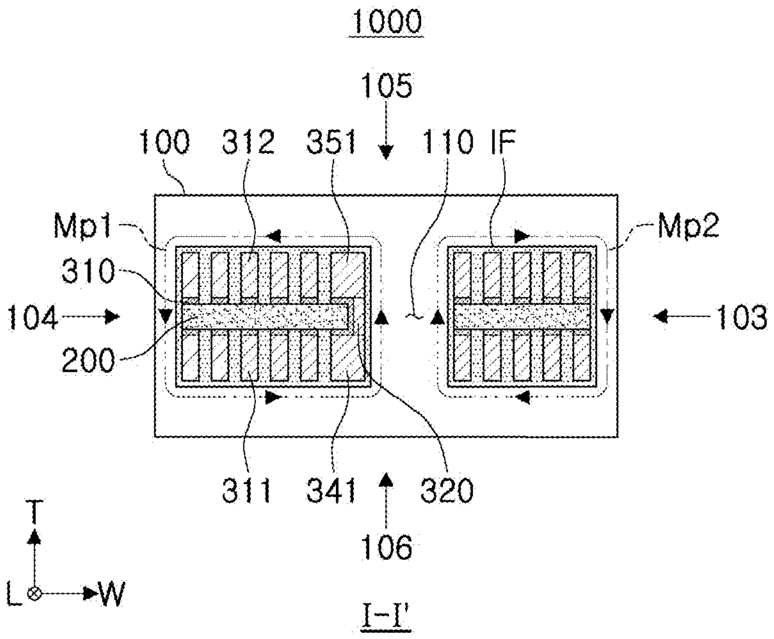
FIG. 2 is a cross-sectional view of FIG. 1 taken along line I-I'.
Figure 3:
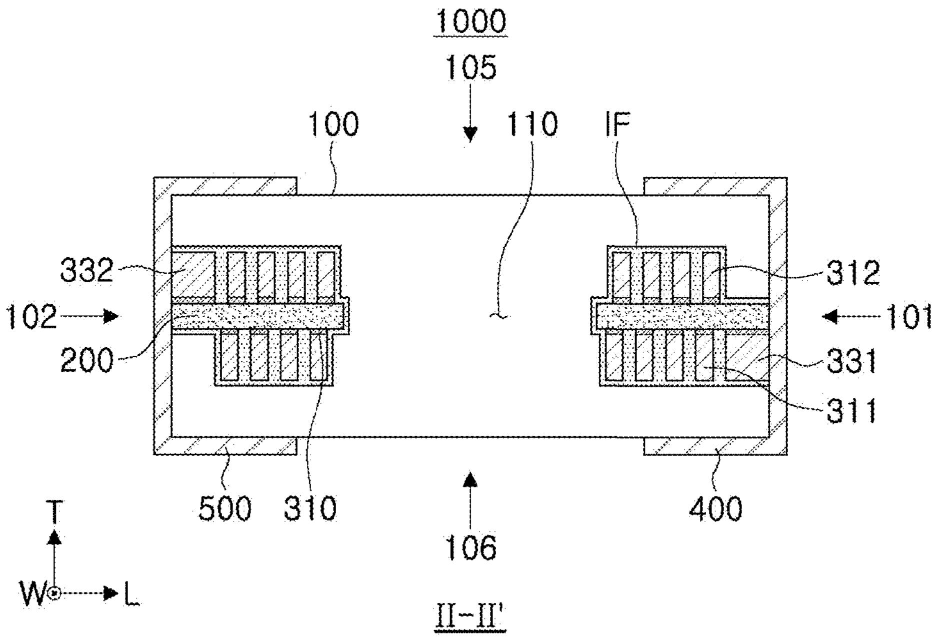
FIG. 3 is a cross-sectional view of FIG. 1 taken along line II-II'.
Figure 4:
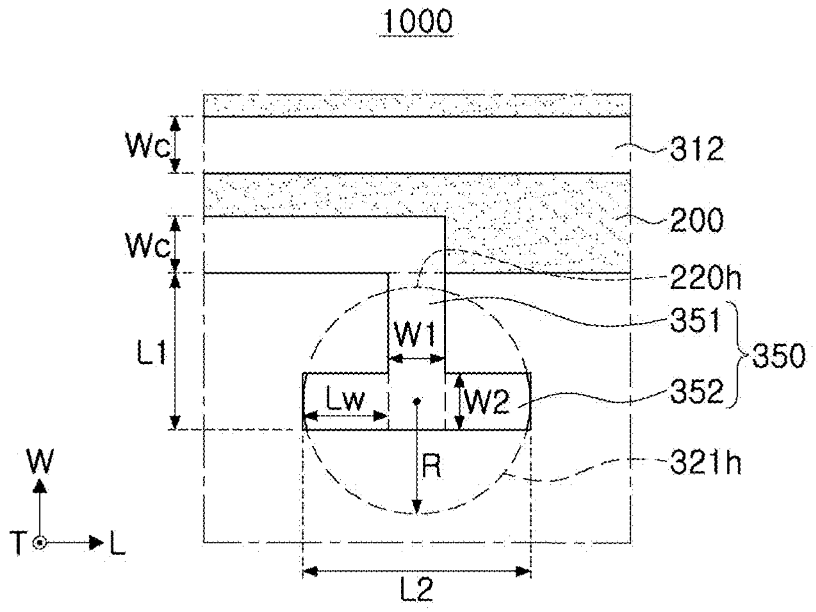
FIG. 4 is a plan view illustrating a structure of via pads of FIG. 1.

FIG. 1 is a schematic perspective view illustrating a coil component 1000 according to a first exemplary embodiment in the present disclosure. FIG. 2 is a cross-sectional view of FIG. 1 taken along line I-I'. FIG. 3 is a cross-sectional view of FIG. 1 taken along line FIG. 4 is a plan view illustrating a structure of via pads 340 and 350 of FIG. 1.

Meanwhile, in order to more clearly illustrate connections between elemental constituents in the present disclosure, an external insulating layer, which is applied to the present exemplary embodiment, on a body 100 is omitted in the drawings.

Referring to FIGS. 1 through 4, the coil component 1000 according to the first exemplary embodiment in the present disclosure may include a body 100, a substrate 200, a coil unit 300, and first and second external electrodes 400 and 500, and may further include an insulating film IF.

The body 100 may form an appearance of the coil component 1000 according to the present exemplary embodiment, and the coil unit 300 and the substrate 200 may be disposed in the body 100.

The body 100 may generally have a hexahedral shape.

Based on the directions of FIGS. 1 through 3, the body 100 may have a first surface 101 and a second surface 102 facing each other in the length direction L, a third surface 103 and a fourth surface 104 facing each other in the width direction W, and a fifth surface 105 and a sixth surface 106 facing each other in the thickness direction T. The first to fourth surfaces 101 to 104 of the body 100 may be wall surfaces of the body 100 that connect the fifth surface 105 and the sixth surface 106 of the body 100 to each other. Hereinafter, opposite end surfaces (one end surface and the other end surface) of the body 100 may refer to the first surface 101 and the second surface 102 of the body, respectively, opposite side surfaces (one side surface and the other side surface) of the body 100 may refer to the third surface 103 and the fourth surface 104 of the body, respectively, and one surface and the other surface of the body 100 may refer to the fifth surface 105 and the sixth surface 106 of the body 100, respectively.

The body 100 may be formed so that the coil component 1000 according to the present exemplary embodiment in which the external electrodes 400 and 500 to be described below are formed, for example, has a length of 2.5 mm, a width of 2.0 mm, and a thickness of 1.0 mm, has a length of 2.0 mm, a width of 1.2 mm, and a thickness of 0.65 mm, has a length of 1.6 mm, a width of 0.8 mm, and a thickness of 0.8 mm, has a length of 1.0 mm, a width of 0.5 mm, and a thickness of 0.5 mm, or has a length of 0.8 mm, a width of 0.4 mm, and a thickness of 0.65 mm, but is not limited thereto. Meanwhile, the above-described numerical values are merely design values in which process errors and the like are not reflected. Thus, numerical values including process errors in an allowable range may be considered to fall within the scope of the present disclosure.

Based on a photograph of a cross section of the coil component 1000 in the length direction L-thickness direction T taken at a central portion thereof in the width direction W using an optical microscope or a scanning electron microscope (SEM), the above-mentioned length of the coil component 1000 may refer to a maximum value among dimensions of a plurality of line segments parallel to the length direction L, each connecting two outermost boundary lines facing each other in the length direction L of the coil component 1000 illustrated in the photograph of the cross section thereof. Alternatively, the length of the coil component 1000 may refer to a minimum value among dimensions of a plurality of line segments parallel to the length direction L, each connecting two outermost boundary lines facing each other in the length direction L of the coil component 1000 illustrated in the photograph of the cross section thereof. Alternatively, the length of the coil component 1000 may refer to an arithmetic mean value of at least three among dimensions of a plurality of line segments parallel to the length direction L, each connecting two outermost boundary lines facing each other in the length direction L of the coil component 1000 illustrated in the photograph of the cross section thereof. Here, the plurality of line segments parallel to the length direction L may be equally spaced from each other in the thickness direction T, but the scope of the present disclosure is not limited thereto.

Based on a photograph of a cross section of the coil component 1000 in the length direction L-thickness direction T taken at a central portion thereof in the width direction W using an optical microscope or a scanning electron microscope (SEM), the above-mentioned thickness of the coil component 1000 may refer to a maximum value among dimensions of a plurality of line segments parallel to the thickness direction T, each connecting two outermost boundary lines facing each other in the thickness direction T of the coil component 1000 illustrated in the photograph of the cross section thereof. Alternatively, the thickness of the coil component 1000 may refer to a minimum value among dimensions of a plurality of line segments parallel to the thickness direction T, each connecting two outermost boundary lines facing each other in the thickness direction T of the coil component 1000 illustrated in the photograph of the cross section thereof. Alternatively, the thickness of the coil component 1000 may refer to an arithmetic mean value of at least three among dimensions of a plurality of line segments parallel to the thickness direction T, each connecting two outermost boundary lines facing each other in the thickness direction T of the coil component 1000 illustrated in the photograph of the cross section thereof. Here, the plurality of line segments parallel to the thickness direction T may be equally spaced from each other in the length direction L, but the scope of the present disclosure is not limited thereto.

Based on a photograph of a cross section of the coil component 1000 in the length direction L-width direction W taken at a central portion thereof in the thickness direction T using an optical microscope or a scanning electron microscope (SEM), the above-mentioned width of the coil component 1000 may refer to a maximum value among dimensions of a plurality of line segments parallel to the width direction W, each connecting two outermost boundary lines facing each other in the width direction W of the coil component 1000 illustrated in the photograph of the cross section thereof. Alternatively, the width of the coil component 1000 may refer to a minimum value among dimensions of a plurality of line segments parallel to the width direction W, each connecting two outermost boundary lines facing each other in the width direction W of the coil component 1000 illustrated in the photograph of the cross section thereof. Alternatively, the width of the coil component 1000 may refer to an arithmetic mean value of at least three among dimensions of a plurality of line segments parallel to the width direction W, each connecting two outermost boundary lines facing each other in the width direction W of the coil component 1000 illustrated in the photograph of the cross section thereof. Here, the plurality of line segments parallel to the width direction W may be equally spaced from each other in the length direction L, but the scope of the present disclosure is not limited thereto.

Alternatively, each of the length, width, and thickness of the coil component 1000 may be measured by a micrometer measurement method. In the micrometer measurement method, each of the length, width, and thickness of the coil component 1000 may be measured by setting a zero point using a micrometer having gauge repeatability and reproducibility (R&R), inserting the coil component 1000 according to the present exemplary embodiment between tips of the micrometer, and turning a measurement lever of the micrometer. Meanwhile, concerning the measurement of the length of the coil component 1000 by the micrometer measurement method, the length of the coil component 1000 may refer to a value measured once, or may refer to an arithmetic mean of values measured multiple times. The same may also be applied to the width and the thickness of the coil component 1000.

The body 100 may include an insulating resin and a magnetic material. Specifically, the body 100 may be formed by stacking one or more magnetic composite sheets in which the magnetic material is dispersed in the insulating resin. The magnetic material may be ferrite or metal magnetic powder.

The ferrite may be, for example, one or more of spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrite such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be one or more of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based alloy powder, and Fe—Cr—Al-based alloy powder.

The metal magnetic powder may be amorphous or crystalline. For example, the metal magnetic powder may be Fe—Si—B—Cr-based amorphous alloy powder, but is not necessarily limited thereto.

Each of the ferrite and the metal magnetic powder may have an average particle diameter of about 0.1 μm to 30 μm, but is not limited thereto.

The body 100 may include two or more types of magnetic materials dispersed in the resin. Here, the different types of magnetic materials mean that the magnetic materials dispersed in the resin are distinguished from each other in terms of any one of average particle diameter, composition, crystallinity, and shape.

Meanwhile, although the body 100 will be described hereinbelow on the premise that the magnetic material is magnetic metal powder, the scope of the present disclosure is not limited to the body 100 having a structure in which the magnetic metal powder is dispersed in the insulating resin.

The insulating resin may include an epoxy, a polyimide, a liquid crystal polymer (LCP), or a mixture thereof, but is not limited thereto.

The body 100 may include a core 110 penetrating through the substrate 200 and the coil unit 300 to be described below. The core 110 may be formed by filling a through-hole 111*h* penetrating through the center of the coil unit 300 and the center of the substrate 200 with the magnetic composite sheets including the magnetic material, but is not limited thereto.

The substrate 200 may be disposed inside the body 100. The substrate 200 may be a component supporting the coil unit 300 to be described below. In addition, the substrate 200 may be a component supporting partition walls 230 that are used in processes for forming the coil unit 300, and a central portion of the substrate 200 may be removed to form a through-hole 111*h* in a trimming process for forming the core 110. Meanwhile, the substrate 200 may be trimmed according to a shape of via pads 340 and 350 to be described below to have a shape corresponding to the shape of the via pads 340 and 350.

Referring to FIGS. 1 and 4, a concave portion 220*h* may be formed in a side surface portion of the substrate 200 contacting the core 110 by a via hole 321*h* remaining after being partially removed, which will be described below. The concave portion 220*h* may be in contact with a via 320, and may have an inwardly concave arc shape.

The substrate 200 may be formed of an insulating material including a thermosetting insulating resin such as an epoxy resin, a thermoplastic insulating resin such as a polyimide resin, or a photosensitive insulating resin, or may be formed of an insulating material in which a reinforcing material such as a glass fiber or an inorganic filler is impregnated in such an insulating resin. As an example, the substrate 200 may be formed of an insulating material such as prepreg, an Ajinomoto build-up film (ABF), FR-4, a bismaleimide triazine (BT) resin, or a photoimagable dielectric (PID), but is not limited thereto.

The inorganic filler may be at least one selected from the group consisting of silica ($SiO_2$), alumina ($Al_2O_3$), silicon carbide (SiC), barium sulfate ($BaSO_4$), talc, clay, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the substrate 200 is formed of an insulating material including a reinforcing material, the substrate 200 may provide more excellent rigidity. When the substrate 200 is formed of an insulating material including no glass fiber, this may be advantageous in decreasing a thickness of the coil component 1000 according to the present exemplary embodiment. In addition, based on the body 100 of the same size, the substrate 200 formed of an insulating material including no glass fiber makes it possible to increase a volume occupied by the coil unit 300 and/or the magnetic metal powder, thereby improving component characteristics. When the substrate 200 is formed of an insulating material including a photosensitive insulating resin, the number of processes for forming the coil unit 300 may decrease, which is advantageous in decreasing a production cost and in forming a fine via 320.

The substrate 200 may have a thickness of, for example, 10 μm or more and 50 μm or less, but is not limited thereto.

The coil unit 300 may be disposed inside the body 100 to exhibit characteristics of the coil component 1000. For example, when the coil component 1000 according to the present exemplary embodiment is utilized as a power inductor, the coil unit 300 may serve to stabilize power of an electronic device by storing an electric field as a magnetic field and maintaining an output voltage.

The coil component 1000 according to the present exemplary embodiment may include a coil unit 300 supported by the substrate 200 inside the body 100.

Referring to FIGS. 2 and 3, the coil unit 300 may include first and second coil patterns 311 and 312, a via 320, first and second via pads 340 and 350, and first and second lead-out portions 331 and 332. Specifically, based on the directions of FIGS. 1 through 3, the first coil pattern 311, the first lead-out portion 331, and the first via pad 340 may be disposed on a lower surface of the substrate 200 facing the sixth surface 106 of the body 100, and the second coil pattern 312, the second lead-out portion 332, and the second via pad 350 may be disposed on an upper surface of the substrate 200 facing the fifth surface 105 of the body 100.

Referring to FIGS. 1, 2, and 4, the via 320 may have one side surface contacting the concave portion 220*h* of the substrate 200 and the other side surfaces exposed to (or facing) the through-hole 111*h*, the other side surfaces of the via 320 being formed along shapes of side surfaces of the first and second via pads 340 and 350. In some embodiments, the other side surface of the via 320 is adjacent to side surfaces of the first and second via pads 340 and 350. Meanwhile, the via hole 321*h*, which is a component for disposing the via 320 therein, may be formed by penetrating through the substrate 200 using a mechanical drill and/or a laser drill, and the via hole 321*h* may be partially removed by a trimming process after the via 320 is formed.

Referring to FIG. 4, a dotted line indicates an area occupied the via hole 321*h* before being partially removed along the shape of the via pad 350, and the via hole 321*h* before being partially removed along the shape of the via pad 350 may be formed by penetrating through the substrate 200 in a circular shape, but is not limited thereto.

Referring to FIGS. 1 through 3, the via 320 may penetrate through the substrate 200 to be connected in contact with an inner end of each of the first coil pattern 311 and the second coil pattern 312. Here, in order to increase reliability in connection between the via 320 and the inner end of each of the first and second coil patterns 311 and 312, the via pads 340 and 350 may be formed to increase areas of the coil patterns connected to the via 320.

However, in a case where areas of the via pads 340 and 350 increase, heights of metal layers for the via pads 340 and 350 also increase in a plating process for forming the coil patterns. Accordingly, interference may occur in magnetic paths when the coil unit 300 generates magnetic fields, together with a decrease in area of the core 110, resulting in a deterioration in inductance characteristics.

In the coil component 1000 according to the present exemplary embodiment, the via pads 340 and 350 may be formed in an inverted T shape, by including connection portions 341 and 351 and wing portions 342 and 352, so as to not only reduce areas of the via pads 340 and 350 but also improve reliability in connection between the via pads 340 and 350 and the via 320.

The inverted T-shaped via pads 340 and 350 make it possible to maintain connection reliability even if a process error has occurred in center alignment between the via hole 321*h* and the via pads 340 and 350.

Referring to FIGS. 1 through 4, the first and second via pads 340 and 350 may include connection portions 341 and 351 connected in contact with the inner ends of the first and second coil patterns 311 and 312, and wing portions 342 and 352 protruding from both side surfaces of the connection portions 341 and 351, respectively.

The connection portions 341 and 351 may extend from the innermost ends of the first and second coil patterns 311 and 312 in a direction toward the center of the first and second coil patterns, that is, toward the core 110.

The connection portions 341 and 351 may be connected to the innermost ends of the first and second coil patterns 311 and 312 at a certain angle, and may be connected perpendicularly to the innermost ends of the first and second coil patterns 311 and 312, but are not limited thereto. Here, the perpendicular connection may refer to a structure in which the coil patterns 311 and 312 are connected to the connection portions 341 and 351, respectively, at an angle of about 90 degrees based on an L-W plane.

The wing portions 342 and 352 may be formed to protrude from both side surfaces of the connection portions 341 and 351, respectively, in opposite directions with respect to the connection portions 341 and 351.

The wing portions 342 and 352 may be connected to the connection portions 341 and 351 at a certain angle, and may be connected perpendicularly to the connection portions 341 and 351, but are not limited thereto. Here, the perpendicular connection may refer to a structure in which the wing portions 342 and 352 are connected to the connection portions 341 and 351, respectively, at an angle of about 90 degrees based on an L-W plane.

Referring to FIG. 4, a line width W1 of each of the connection portions 341 and 351 and a line width W2 of each of the wing portions 342 and 352 may be substantially the same or smaller than a line width Wc of each of the coil patterns 311 and 312. Here, substantially the same line width refers to a line width including a process error in an allowable range (e.g., a difference of 1/10 or less) or a positional deviation occurring during a manufacturing process and an error occurring during measurement.

Based on a photograph of a cross section of each of the coil patterns 311 and 312 in the length direction L-width direction W taken at a central portion thereof in the thickness direction T using an optical microscope or a scanning electron microscope (SEM), the above-mentioned line width Wc of each of the coil patterns 311 and 312 may refer to a maximum value among dimensions of a plurality of line segments parallel to the width direction W, each connecting two outermost boundary lines facing each other in the width direction W of a straight portion of a coil turn of each of the coil patterns 311 and 312 illustrated in the photograph of the cross section thereof. Alternatively, the line width Wc of each of the coil patterns 311 and 312 may refer to a minimum value among dimensions of a plurality of line segments parallel to the width direction W, each connecting two outermost boundary lines facing each other in the width direction W of a straight portion of a coil turn of each of the coil patterns 311 and 312 illustrated in the photograph of the cross section thereof. Alternatively, the line width We of each of the coil patterns 311 and 312 may refer to an arithmetic mean value of at least three among dimensions of a plurality of line segments parallel to the width direction W, each connecting two outermost boundary lines facing each other in the width direction W of a straight portion of a coil turn of each of the coil patterns 311 and 312 illustrated in the photograph of the cross section thereof. Here, the plurality of line segments parallel to the width direction W may be equally spaced from each other in the length direction L, but the scope of the present disclosure is not limited thereto.

Meanwhile, the line width W1 of each of the connection portions 341 and 351 and the line widths W2 of each of the wing portions 342 and 352 may also be measured in the same manner as described above.

Referring to FIG. 4, each of the connection portions 341 and 351 may be formed to have a length L1 in a range of more than 1 μm and less than 78 μm. When the length L1 of each of the connection portions 341 and 351 is 1 μm or less, the connection portions 341 and 351 may not contact the via 320, and when the length L1 of each of the connection portions 341 and 351 is 78 μm or more, the inductance (Ls) of the coil component 1000 may become smaller than a reference value, i.e., 0.90 pH. Thus, it is preferable that the length L1 of each of the connection portions 341 and 351 is in the range of more than 1 μm and less than 78 μm. The inductance may be measured by a frequency generator and an oscilloscope or an LCM multimeter. Other methods and/or tools appreciated by one of ordinary skill in the art, even if not described in the present disclosure, may also be used.

Table 1 shows experimental data indicating whether the inductance decreases and whether an open defect has occurred according to a change in length L1 of each of the connection portions 341 and 351. Referring to Tables 1 and FIG. 4, a diameter 2R of the via 320 refers to a diameter of the via 320 or the via hole 321*h* before being trimmed to the shape of the via pads 340 and 350, and may be about 60 μm, but is not limited thereto.

TABLE 1

| Line width W1 (μm) of via pad | L1 (μm) | Diameter (2R) (μm) of via | L1/2R | magnetic path | Ls (μH) | Decrease in Ls | Open defect |
|---|---|---|---|---|---|---|---|
| 15 | 1 | 60 | 0.02 | 558 | 1.19 | OK | NG |
| 15 | 10 | | 0.17 | 579 | 1.15 | OK | OK |
| 15 | 20 | | 0.33 | 603 | 1.10 | OK | OK |
| 15 | 30 | | 0.50 | 628 | 1.06 | OK | OK |
| 15 | 40 | | 0.67 | 653 | 1.02 | OK | OK |
| 15 | 50 | | 0.83 | 679 | 0.98 | OK | OK |
| 15 | 60 | | 1.00 | 706 | 0.94 | OK | OK |
| 15 | 70 | | 1.17 | 732 | 0.91 | OK | OK |
| 15 | 78 | | 1.30 | 754 | 0.88 | NG | OK |

Referring to FIG. 2 and Table 1, magnetic paths (paths of magnetic fields) may be formed to pass through the core 110 and surround the outside of the coil unit in a winding direction of the coil patterns 311 and 312. Specifically, the magnetic paths formed may include a magnetic path Mp1 on a side where the via pads 340 and 350 are present and a magnetic path Mp2 on a side where the via pads 340 and 350 are absent. In this case, as the length L1 of each of the connection portions 341 and 351 increases, a length of the magnetic path Mp1 on the side where the via pads 340 and 350 are present may increase together, and accordingly, the inductance characteristics (Ls) may decrease. Referring to Table 1, in order to prevent a decrease in inductance characteristics (Ls) to the reference value while not causing an open defect, a ratio (L1/2R) of the length L1 of each of the connection portions 341 and 351 to the diameter 2R of the via 320 may be in a range of more than 0.02 and less than 1.30. For example, when the diameter 2R of the via 320 is 60 μm, the length L1 of each of the connection portions 341 and 351 may be in a range of more than 1 μm and less than 78 μm, but is not limited thereto.

Referring to FIG. 4, in the via pads 340 and 350 included in the coil component 1000 according to the present exemplary embodiment, a ratio Lw/W1 of a length Lw of each of the wing portions 342 and 352 to the line width W1 of each of the connection portions 341 and 351 may be more than 0 and less than 1.5, but is not limited thereto.

For example, when the line width W1 of each of the connection portions 341 and 351 is 15 μm, a sum L2 of the line width W1 of each of the connection portions 341 and 351 and lengths Lw of corresponding wing portions 342 or 352 may be more than 15 μm and less than 60 μm. The line width W1 of each of the connection portions 341 and 351 may be substantially the same as the line width We of each of the coil patterns 311 and 312, and may be about 15 μm, but is not limited thereto. In addition, the via hole 321*h* may be formed to have a diameter 2R of about 60 μm, but is not limited thereto.

Therefore, when the ratio Lw/W1 of the length Lw of each of the wing portions 342 and 352 to the line width W1 of each of the connection portions 341 and 351 is 0, that is, when the sum L2 of the line width W1 of each of the connection portions 341 and 351 and the lengths Lw of the corresponding wing portions 342 or 352 is 15 μm, this may refer to a structure in which there are only connection portions 341 and 351 without wing portions 342 and 352. Alternatively, when the sum L2 of the line width W1 of each of the connection portions 341 and 351 and the lengths Lw of the corresponding wing portions 342 or 352 is 60 μm, this may refer to a structure in which the sum L2 of the line width W1 of each of the connection portions 341 and 351 and the lengths Lw of the corresponding wing portions 342 or 352 may be substantially the same as the diameter 2R of the via hole 321*h*.

Meanwhile, the via hole 321*h* may be trimmed along the shape of the via pads 340 and 350 after the via 320 is formed by means of partition walls 230 to be described below, and a detailed manufacturing process will be described below.

Meanwhile, based on a photograph of a cross section of each of the coil patterns 311 and 312 in the length direction L-width direction W taken in a central portion thereof in the thickness direction T using an optical microscope or a scanning electron microscope (SEM), the length L1 of each of the connection portions 341 and 351, the length Lw of each of the wing portions 342 and 352, and the diameter 2R of the via 320 may be measured in the same manner as the line width We of each of the coil patterns 311 and 312 described above. The diameter 2R of the via 320 or the via hole 321*h* may be calculated using a measurement value of a length R from a center point at which the connection portions 341 and 351 and the wing portions 342 and 352 intersect each other to the concave portion 220*h*.

Referring to FIG. 4, since the connection portions 341 and 351 and the wing portions 342 and 352 of the via pads 340 and 350 intersect each other in an inverted T shape, the via pads 340 and 350 can be easily aligned with the center of the via hole 321*h*. Even if there is a slight deviation in position between the center of the via hole 321*h* and the via pads 340 and 350, it is possible to maintain reliability in connection between the via pads 340 and 350 and the via 320 filled in the via hole 321*h*.

The first lead-out portion 331 may be connected to the first coil pattern 311 and exposed to (or extend from) the first surface 101 of the body 100, and may be connected to the first external electrode 400 to be described below.

That is, an input from the first external electrode 400 may be output through the second external electrode 500 after sequentially passing through the first lead-out portion 331, the first coil pattern 311, the first via pad 340, the via 320, the second via pad 350, the second coil pattern 312, and the second lead-out portion 332.

By doing so, the coil unit 300 may function as a single coil as a whole between the first and second external electrodes 400 and 500.

Referring to FIGS. 1 through 3, each of the first coil pattern 311 and the second coil pattern 312 may have a planar spiral shape in which at least one turn is formed around the core 110. The first coil pattern 311 may form at least one turn around the core 110 on the lower surface of the substrate 200. The second coil pattern 312 may form at least one turn around the core 110 on the upper surface of the substrate 200.

Referring to FIGS. 1 and 3, the first and second lead-out portions 331 and 332 may be exposed to (or extend from) the first and second surfaces 101 and 102 of the body 100, respectively. Specifically, the first lead-out portion 331 may be exposed to (or extend from) the first surface 101 of the body 100, and the second lead-out portion 332 may be exposed to (or extend from) the second surface 102 of the body 100.

At least one of the first and second coil patterns 311 and 312, the first and second via pads 340 and 350, the via 320, and the first and second lead-out portions 331 and 332 may include at least one conductive layer.

For example, when the first coil pattern 311, the first via pad 340, the via 320, and the first lead-out portion 331 are plated on the lower surface of the substrate 200, each of the first coil pattern 311, the first via pad 340, the via 320, and the first lead-out portion 331 may include a seed layer 310 and an electrolytic plating layer. Here, the electrolytic plating layer may have a single-layer structure or have a multi-layer structure. The electrolytic plating layer having the multi-layer structure may be formed in a conformal film structure in which one electrolytic plating layer is formed along a surface of another electrolytic plating layer, or may be formed by stacking one electrolytic plating layer on only one surface of another electrolytic plating layer. The seed layer 310 may be formed by an electroless plating method, a vapor deposition method such as sputtering, or the like. The seed layers 310 of the first coil pattern 311, the first via pad 340, the via 320, and the first lead-out portion 331 may be integrally formed, such that no boundaries are formed therebetween, but are not limited thereto. The electrolytic plating layers of the first coil pattern 311, the first via pad 340, the via 320, and the first lead-out portion 331 may be integrally formed, such that no boundaries are formed therebetween, but are not limited thereto.

Each of the first coil pattern 311, the first via pad 340, the via 320, and the first lead-out portion 331 may be formed of a conductive material such as copper (Cu), aluminum (Al), silver (Ag), tin (Sn), gold (Au), nickel (Ni), lead (Pb), titanium (Ti), chromium (Cr), or an alloy thereof, but is not limited thereto.

The insulating film IF may be disposed between the coil unit 300 and the body 100 and between the substrate 200 and the body 100. The insulating film IF may be formed along the surfaces of the substrate 200 on which the first and second coil patterns 311 and 312, the first and second via pads 340 and 350, and the first and second lead-out portions 331 and 332 are formed, but is not limited thereto.

The insulating film IF may be filled between adjacent turns of each of the first and second coil patterns 311 and 312, between the first lead-out portion 331 and the first coil pattern 311, and between the second lead-out portion 332 and the second coil pattern 312 for insulation between coil turns.

The insulating film IF may be provided to insulate the coil unit 300 and the body 100 from each other, and may include a known insulating material such as parylene, but is not limited thereto. As another example, the insulating film IF may include an insulating material such as an epoxy resin rather than parylene. The insulating film IF may be formed by a vapor deposition method, but is not limited thereto. As another example, the insulating film IF may be formed by stacking insulation films for forming the insulating film IF on both surfaces of the substrate 200 on which the coil unit 300 is formed and then curing the insulation films, or may be formed by applying an insulation paste for forming the insulating film IF onto both surfaces of the substrate 200 on which the coil unit 300 is formed and then curing the insulation paste. Meanwhile, the insulating film IF may be omitted in the present exemplary embodiment for the above-described reason. That is, if the body 100 has a sufficient electrical resistance at an operating current and voltage designed for the coil component 1000 according to the present exemplary embodiment, the insulating film IF may be omitted in the present exemplary embodiment.

The external electrodes 400 and 500 may be disposed to be spaced apart from each other on the body 100, while respectively being connected to the coil unit 300. Specifically, the first external electrode 400 may be disposed on the first surface 101 of the body 100 to be connected in contact with the first lead-out portion 331 that is exposed to the first surface 101 of the body 100, and the second external electrode 500 may be disposed on the second surface 102 of the body 100 to be connected in contact with the second lead-out portion 332 that is exposed to the second surface 102 of the body 100.

The first external electrode 400 may be disposed on the first surface 101 of the body 100 and extend to at least some of the third to sixth surfaces 103 to 106 of the body 100. The second external electrode 500 may be disposed on the second surface 102 of the body 100 and extend to at least some of the third to sixth surfaces 103 to 106 of the body 100.

Meanwhile, each of the first and second external electrodes 400 and 500 disposed on the first and second surfaces 101 and 102 of the body 100, respectively, may extend only to the sixth surface 106 of the body 100.

In this case, the first external electrode 400 may include a first pad portion disposed on the sixth surface 106 of the body 100, and a first extension portion disposed on the first surface 101 of the body 100 to connect the first lead-out portion 331 and the first pad portion to each other.

In addition, the second external electrode 500 may include a second pad portion disposed to be spaced apart from the first pad portion on the sixth surface 106 of the body 100, and a second extension portion disposed on the second surface 102 of the body 100 to connect the second lead-out portion 332 and the second pad portion to each other.

The pad portion and the extension portion may be formed together in the same process to be integrally formed without any boundaries formed therebetween, but the scope of the present disclosure is not limited thereto.

The external electrodes 400 and 500 may be formed by a vapor deposition method such as sputtering and/or a plating method, but are not limited thereto.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or an alloy thereof, but is not limited thereto.

Each of the external electrodes 400 and 500 may be formed in a single-layer structure or have a multi-layer structure. For example, each of the external electrodes 400 and 500 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be formed to cover the first conductive layer, but the scope of the present disclosure is not limited thereto. The first conductive layer may be a plating layer, or a conductive resin layer formed by applying and curing a conductive resin including a conductive powder containing at least one of copper (Cu) and silver (Ag) and a resin. The second and third conductive layers may be plating layers, but the scope of the present disclosure is not limited thereto.

The coil component 1000 according to the present exemplary embodiment may further include an external insulating layer disposed on the third to sixth surfaces 103 to 106 of the body 100. The external insulating layer may be disposed in regions other than the regions where the external electrodes 400 and 500 are disposed.

At least partial portions of the external insulating layer disposed on the third to sixth surfaces 103 to 106 of the body 100 may be formed in the same process to be integrally formed without any boundaries formed therebetween, but the scope of the present disclosure is not limited thereto.

The external insulating layer may be formed by forming an insulating material for forming the external insulating layer by a printing method, a vapor deposition method, a spray application method, a film lamination method, or the like, but is not limited thereto.

The external insulating layer may include a thermoplastic resin such as polystyrene, vinyl acetate, polyester, polyethylene, polypropylene, polyamide, rubber, or acryl, a thermosetting resin such as phenol, epoxy, urethane, melamine, or alkyd, a photosensitive resin, parylene, $SiO_x$, or $SiN_x$. The external insulating layer may further include an insulating filler such as an inorganic filler, but is not limited thereto.

Second to Fourth Exemplary Embodiments

Figure 5:
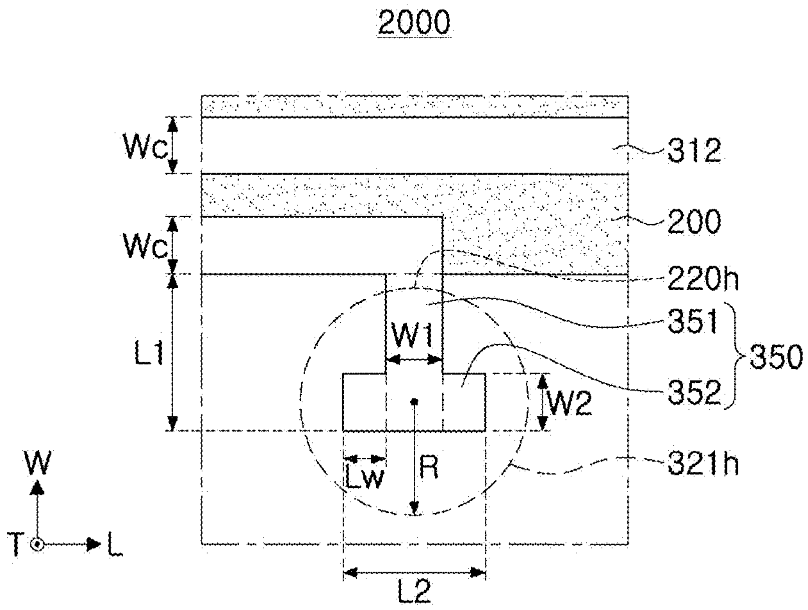
FIG. 5 is a view related to a second exemplary embodiment and corresponding to FIG. 4.
Figure 6:
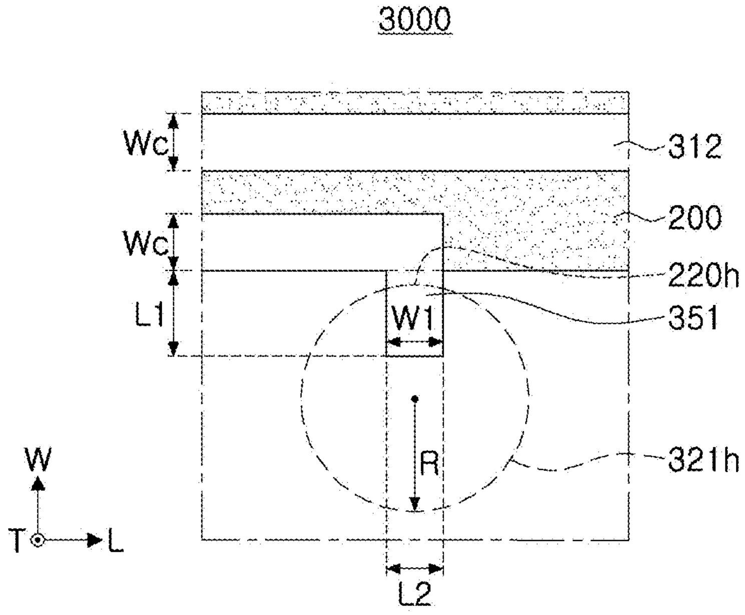
FIG. 6 is a view related to a third exemplary embodiment and corresponding to FIG. 4.
Figure 7:
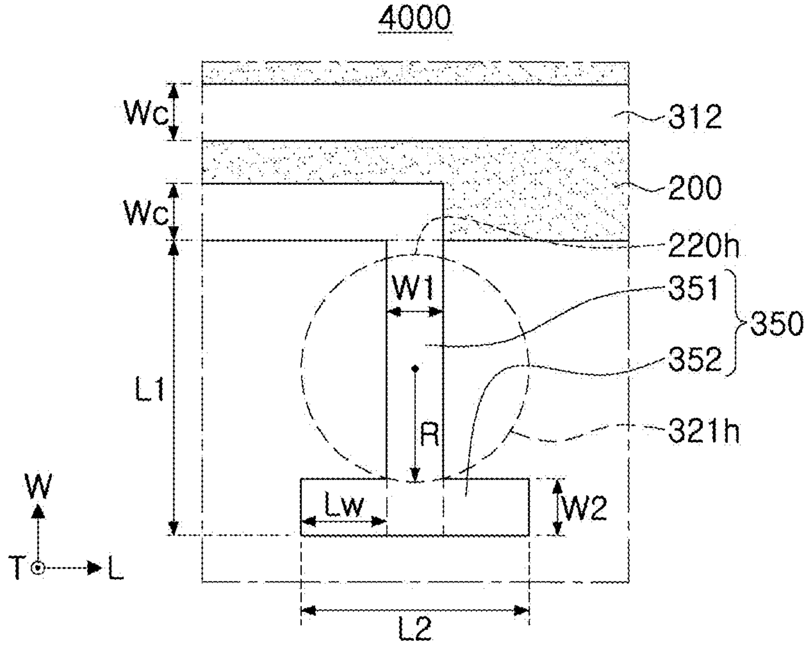
FIG. 7 is a view related to a fourth exemplary embodiment and corresponding to FIG. 4.

FIG. 5 is a view related to a second exemplary embodiment and corresponding to FIG. 4. FIG. 6 is a view related to a third exemplary embodiment and corresponding to FIG. 4. FIG. 7 is a view related to a fourth exemplary embodiment and corresponding to FIG. 4.

Referring to FIGS. 5 through 7, coil components 2000, 3000, and 4000 according to the second to fourth exemplary embodiments in the present disclosure are different from the coil component 1000 according to the first exemplary embodiment in the present disclosure in structures of the connection portions 341 and 351 and the wing portions 342 and 352 of the via pads 340 and 350, and areas of the connection portions 341 and 351 contacting the via 320. Thus, in describing the present exemplary embodiments, only the via 320 and the via pads 340 and 350, which are different from those in the first exemplary embodiment in the present disclosure, will be described. Concerning the other configuration of the present exemplary embodiments, what has been described above for the first exemplary embodiment in the present disclosure may be identically applied thereto.

FIG. 5 is a view related to the second exemplary embodiment and corresponding to FIG. 4.

Referring to FIG. 5, in the coil component 2000 according to the second exemplary embodiment, the wing portion 352 may have a length Lw smaller than that in the coil component 1000 according to the first exemplary embodiment.

In this case, the wing portions 352 may be located within an area of the before-trimmed via hole 321*h*. According to the decrease in area of the via pad 350, it is possible to secure an area of the core 110, thereby improving inductance characteristics (Ls).

FIG. 6 is a view related to the third exemplary embodiment and corresponding to FIG. 4.

Referring to FIG. 6, in the coil component 3000 according to the third exemplary embodiment, the via pad 350 may include only a connection portion 351 while omitting wing portions 352 protruding from both side surfaces of the connection portion 351. Accordingly, L2 may be substantially the same as the line width W1 of the connection portion 351, and may be substantially the same or smaller than the line width We of the second coil pattern 312.

In this case, the area of the core 110 can be further secured as compared to that in the coil component 1000 or 2000 according to the first or second exemplary embodiment. In addition, according to the decrease in length L1 of the connection portion, the magnetic path Mp1 can be reduced as shown in Table 1 and FIG. 2, thereby improving inductance characteristics (Ls).

FIG. 7 is a view related to the fourth exemplary embodiment and corresponding to FIG. 4.

Referring to FIG. 7, in the coil component 4000 according to the fourth exemplary embodiment, the length L1 of the connection portion 351 in the via pad 350 may be larger than the diameter 2R of the via 320. Here, the diameter 2R of the via 320 may be substantially the same as the diameter 2R of the via hole 321*h*.

In this case, even if alignment in the width direction (W direction) between the center of the via hole 321*h* and the via pad 350 is further deviated than those in the coil components 1000, 2000, and 3000 according to the first to third exemplary embodiments, connection reliability can be maintained by the connection portion 352 having a length L1 larger than the diameter 2R of the via hole 321*h*.

(Processes for Manufacturing Via Pads Using Partition Walls)

Figure 8A:
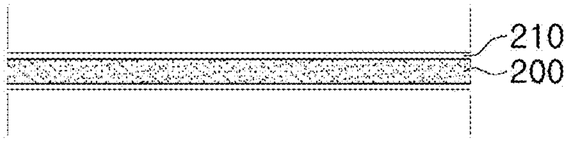
FIGS. 8A to 8H are views sequentially illustrating processes for forming a coil unit using partition walls.
Figure 8B:
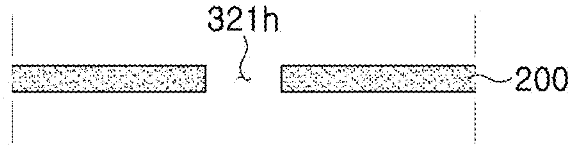

FIGS. 8A and 8B are views sequentially illustrating processes for forming a coil unit using partition walls.

Referring to FIG. 8A, a substrate 200 may be prepared first. The substrate 200 may be a typical copper clad laminate (CCL) or the like. In this case, thin copper foils 210 may be formed on both surfaces of the substrate 200.

Next, referring to FIG. 8B, the copper foils 210 may be removed from the substrate 200 and a via hole 321*h* may be formed in the substrate 200. The via hole 321*h* may be formed using a mechanical drill and/or a laser drill.

Figure 8C:
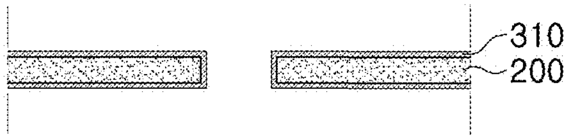

Next, referring to FIG. 8C, seed layers 310 may be formed on both surfaces of the substrate 200 and a wall surface of the via hole 321*h*. The seed layers 310 may be formed by a known method, for example, chemical vapor deposition (CVD), physical vapor deposition (PVD), sputtering, or the like using a dry film or the like, but is not limited thereto.

Figure 8D:
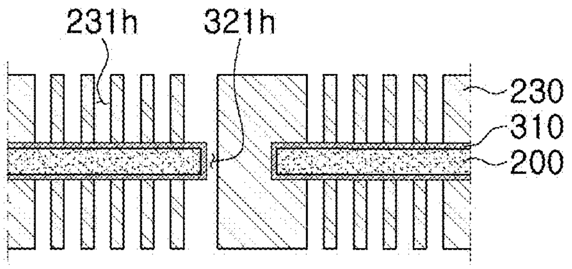

Next, referring to FIG. 8D, partition walls 230 may be formed on both surfaces of the substrate 200.

The partition walls 230 may be resist films, and may be formed by laminating and curing resist films or by coating and curing a resist film material, but is not limited thereto. As an example of a lamination method, after a hot press in which which the resist films are pressurized at a high temperature for a predetermined period of time and then depressurized to be cooled to room temperature, the resist films are cooled in a cold press such that a working tool is detached. As an example of a coating method, a screen-printing method in which ink is applied with a squeegee, a spray printing method in which ink is applied in a mist type, or the like may be used. The curing may mean that the resist films are dried so as not to be fully cured in order to use a photolithography method or the like as a post process.

Openings 231*h* having a planar coil shape may be formed between the partition walls 230, and the openings 231*h* may be patterned sequentially or patterned simultaneously, by using a known photolithography method, that is, a known exposure and development method. An exposure machine or a developer is not particularly limited, and may be appropriately selected and used according to a photosensitive material to be used.

At this time, the partition walls 230 may be disposed to correspond to the shape of the via pads 340 and 350, and a partition wall 230 may also be disposed inside a partial region of the via hole 321*h*, such that a via 320 is formed to conform to the shape of the via pads 340 and 350, in a later plating process.

Figure 8E:
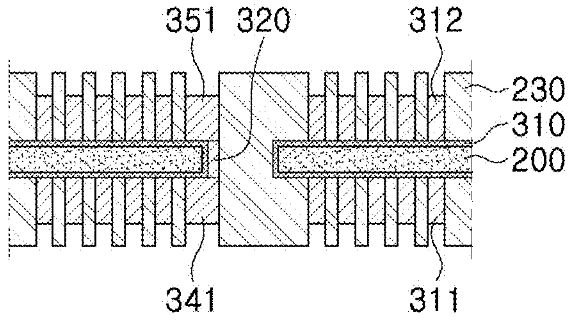

Next, referring to FIG. 8E, by using the openings 231*h* between the partition walls 230 as a plating growth guide, first and second coil patterns 311 and 312, first and second via pads 340 and 350, a via 320, and first and second lead-out portions 331 and 332 may be formed on the seed layers 310. At this time, since they are formed by a single plating process, the via 320 and the first and second via pads 340 and 350 may be integrally formed. Meanwhile, in FIG. 8B, only the connection portions 341 and 351 are shown with respect to the via pads 340 and 350 due to their positions in the cross section.

The via 320 formed at this time may be disposed in the via hole 321*h* to connect the first and second via pads 340 and 350 to each other, and may have one side surface that contacts an inner wall of the via hole 321*h* and the other side surfaces that do not contact the inner wall of the via hole 321*h*. Meanwhile, a region of the via hole 321*h* remaining in the substrate 200 after a trimming process may become a concave portion 220*h*.

As a result, the via 320 trimmed along the shape of the via pads 340 and 350 may have one side surface contacting the concave portion 220*h* and the other side surfaces exposed to the through-hole 111*h*, the other side surfaces of the via 320 being formed along shapes of side surfaces of the first and second via pads 340 and 350.

Meanwhile, the method of manufacturing the coil unit 300 using the partition walls 230 as in the present disclosure is advantageous in that it is easy to adjust a shape of a coil conductor because the opening patterns are formed in the insulator to be used as a guide at the time of plating, unlike a conventional anisotropic plating technology. That is, the first and second coil patterns 311 and 312 to be formed may have flat side surfaces in contact with the partition walls 230. Here, the term "flat" is a concept including not only completely flat but also substantially flat. That is, it is taken into account that the wall surfaces of the opening patterns have a certain roughness by the photolithography method. A plating method is not particularly limited, and electrolytic plating, electroless plating, or the like may be used, but the plating method is not limited thereto.

Figure 8F:
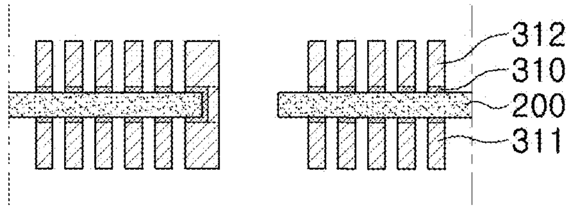

Next, referring to FIG. 8F, after the first and second coil patterns 311 and 312, the first and second via pads 340 and 350, the via 320, and the first and second lead-out portions 331 and 332 are formed, the partition walls 230 may be removed. The partition walls 230 may be removed using known stripping liquor or the like. In this case, after the partition walls 230 are removed, the seed layers 310 may be etched to form patterns.

The via pads 340 and 350 may be formed at respective inner ends of the first and second coil patterns 311 and 312 to connect the first and second coil patterns 311 and 312 to the via 320, and may include connection portions 341 and 351 directly contacting the first and second coil patterns 311 and 312 and wing portions 342 and 352 protruding from both side surfaces of the connection portions 341 and 351. At this time, a line width W1 of each of the connection portions 341 and 351 and a line width W2 of each of the wing portions 342 and 352 may be substantially the same or smaller than a line width We of each of the first and second coil patterns 311 and 312.

Figure 8G:
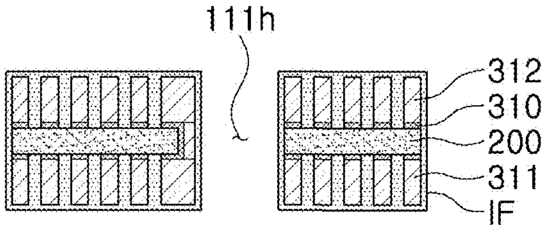

Next, referring to FIG. 8G, a through-hole 111*h* penetrating through the substrate 200 may be formed through a trimming process. At this time, the substrate 200 and the via 320 located between the first and second via pads 340 and 350 may also be trimmed together. As a result, side surfaces of the first and second via pads 340 and 350, the via 320, and the substrate 200 contacting the through-hole 111*h* may correspond to each other in shape, and thus may be substantially coplanar with each other, but are not limited thereto.

The through-hole 111*h* may be formed using a mechanical drill and/or a laser drill. The through-hole 111*h* may be connected to the via hole 321*h* to form a single hole. In the trimming process, a penetration region may also be formed in a peripheral region as well as the central region. That is, in the trimming process, the substrate 200 may have penetration regions in both the central region and the peripheral region thereof to have a shape corresponding to the planar shape of the first and second coil patterns 311 and 312, and such regions may be filled with a magnetic material. As a result, more excellent coil properties can be realized.

Next, an insulating film IF may be formed. The insulating film IF may be coated using chemical vapor deposition (CVD) or the like.

Figure 8H:
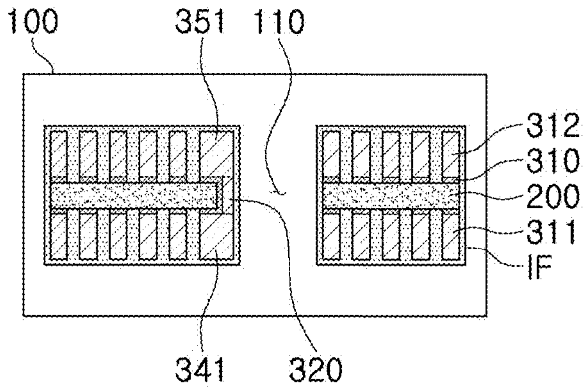

Lastly, referring to FIG. 8H, a body 100 may be formed by stacking magnetic sheets on upper and lower sides of the substrate 200 and the coil unit 300, and then external electrodes 400 and 500 may be disposed on surfaces of the body 100 to be spaced apart from each other, while respectively being connected to the coil unit 300.

(Effect of Inverted T-Shaped Via Pad)

Figure 9:
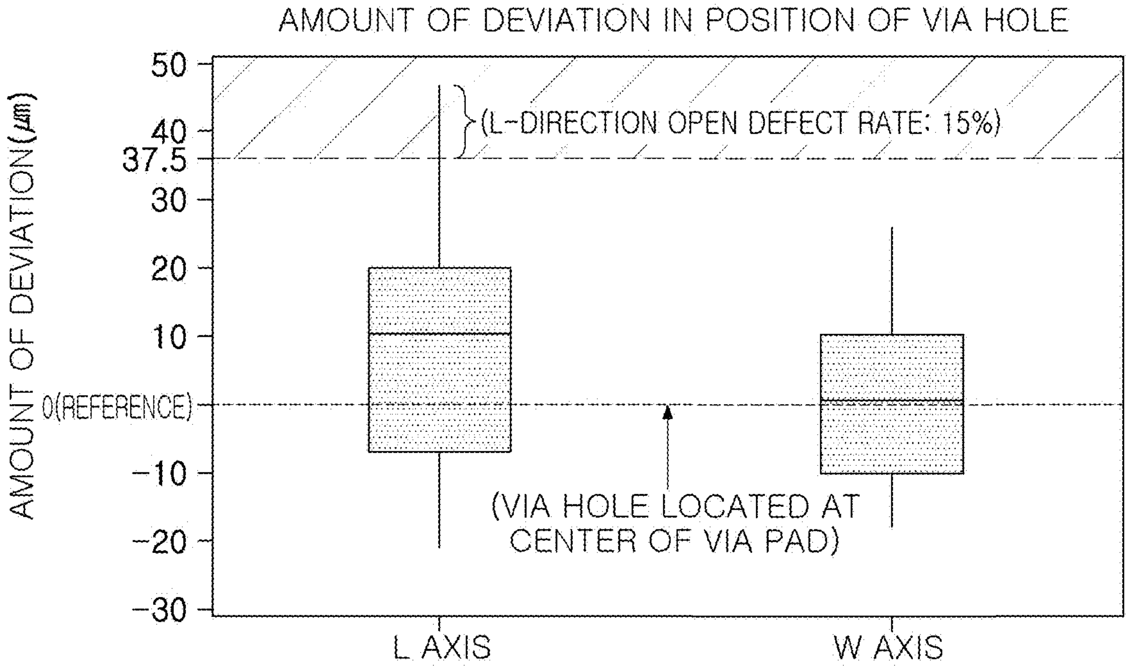
FIG. 9 is a view illustrating experimental data regarding an amount of change in position of a via hole between manufacturing processes using a partition wall technique.

FIG. 9 is a view illustrating experimental data regarding an amount of change in position of a via hole between manufacturing processes using a partition wall technique.

Referring to FIG. 9, it is considered as a best mode for a reference case that a center point of a via hole is located at the center of a via pad, but a coil component may have an alignment error along an L axis (horizontal axis) in the length direction or along a W axis (vertical axis) in the width direction, which causes a deviation in position of a via hole.

In this case, given the specifications of the coil component manufactured using the partition wall technique, in a case where the via pad does not have an inverted T shape while having substantially the same line width as the coil pattern, when the via hole is deviated by 37.5 μm or more has occurred based on the L axis, connection reliability between the via and the via pad may deteriorate, thereby causing an open defect. According to the experimental data, such deviations have occurred in about 15% of the experiments.

Therefore, when the via pads 340 and 350 have an inverted T-shape by including connection portions 341 and 351 and wing portions 342 and 352 as in the coil component according to the present disclosure, high connection reliability between the via 320 and the via pads 340 and 350 can be maintained even if the via hole 321*h* is deviated in the L-axis direction, while the via pads 340 and 350 are formed to have a small line width to reduce an area occupied by the via pads 340 and 350.

As set forth above, according to the exemplary embodiments in the present disclosure, it is possible to provide a coil component having improved inductance characteristics by minimizing an area occupied by via pads, while maintaining connection reliability between the via pads and the via even if a process error has occurred in alignment between the via pads and the via hole.

While exemplary embodiments have been shown and described above, it will be apparent to those skilled in the art that modifications and variations could be made without departing from the scope of the present invention as defined by the appended claims.

What is claimed is:

1. A coil component comprising:
a body including a magnetic material;
a substrate disposed in the body;
a coil unit including
first and second coil patterns disposed on both surfaces of the substrate, respectively,
first and second via pads connected to inner ends of the first and second coil patterns, respectively, and
a via connecting the first and second via pads to each other; and
first and second external electrodes disposed to be spaced apart from each other on the body, while respectively being connected to the coil unit,
wherein the first and second via pads include connection portions connected to the first and second coil patterns, respectively, and wing portions protruding from both side surfaces of the connection portions,
each of the connection portions has substantially the same or smaller line width than each of the first and second coil patterns,
each of the wing portions has substantially the same or smaller line width than each of the first and second coil patterns,
the line width of each of the wing portions is along a direction from innermost ends of the first and second coil patterns toward the center of the first and second coil patterns, and
the connection portion of the first via pad and the wing portion of the first via pad intersect each other in an inverted T-shape.

2. The coil component of claim 1, wherein the connection portions extend from the innermost ends of the first and second coil patterns, respectively, in a direction toward the center of the first and second coil patterns.

3. The coil component of claim 2, wherein the connection portions are connected perpendicularly to the first and second coil patterns, respectively.

4. The coil component of claim 1, wherein a ratio L1/2R of a length L1 of each of the connection portions to a diameter 2R of the via is more than 0.02 and less than 1.30.

5. The coil component of claim 2, wherein a ratio L1/2R of a length L1 of each of the connection portions to a diameter 2R of the via is more than 0.02 and less than 1.30.

6. The coil component of claim 1, wherein a length L1 of each of the connection portions is more than 1 μm and less than 78 μm.

7. The coil component of claim 5, wherein the length L1 of each of the connection portions is more than 1 μm and less than 78 μm.

8. The coil component of claim 1, wherein the wing portions protrude in opposite directions with respect to each of the connection portions.

9. The coil component of claim 8, wherein each of the connection portions is connected perpendicularly to the wing portions on both side surfaces thereof.

10. The coil component of claim 5, wherein the wing portions protrude in opposite directions with respect to each of the connection portions.

11. The coil component of claim 2, wherein a ratio Lw/W1 of a length Lw of each of the wing portions to a line width W1 of each of the connection portions is more than 0 and less than 1.5.

12. The coil component of claim 4, wherein a ratio Lw/W1 of a length Lw of each of the wing portions to a line width W1 of each of the connection portions is more than 0 and less than 1.5.

13. The coil component of claim 1, further comprising a via hole,
wherein the via is disposed in the via hole, and
as viewed from a plan view of the coil component, an entirety of the wing portions overlap the via hole.

14. A coil component comprising:
a body including a magnetic material;
a substrate disposed in the body;
a coil unit including
first and second coil patterns disposed on both surfaces of the substrate, respectively,
first and second via pads connected to inner ends of the first and second coil patterns, respectively, and
a via connecting the first and second via pads to each other; and
first and second external electrodes disposed to be spaced apart from each other on the body, while respectively being connected to the coil unit,
wherein the first and second via pads include connection portions extending from innermost ends of the first and second coil patterns, respectively, in a direction toward the center of the first and second coil patterns,
each of the first and second via pads has substantially the same or smaller line width than each of the first and second coil patterns, and
a ratio L1/2R of a length L1, in a direction from the innermost ends of the first and second coil patterns toward the center of the first and second coil patterns, of each of the connection portions to a diameter 2R of the via is more than 0.02 and less than 1.30.

15. The coil component of claim 1, wherein the first and second via pads and the via are integrally formed.

16. The coil component of claim 1, wherein the substrate has a concave portion disposed in a side surface of the substrate contacting the via.

17. The coil component of claim 16, wherein the substrate has a through-hole disposed in a central portion thereof, the through-hole being filled with the magnetic material.

18. The coil component of claim 17, wherein the via has a first side surface contacting the concave portion and a second side surface facing the through-hole, the second side surface of the via is adjacent to side surfaces of the first and second via pads.

19. The coil component of claim 1, further comprising an insulating film integrally covering the coil unit and the substrate.

20. The coil component of claim 19, wherein the coil unit further includes first and second lead-out portions extending from surfaces of the body to be connected to the first and second external electrodes, respectively, and
the insulating film is filled between adjacent turns of each of the first and second coil patterns, between the first lead-out portion and the first coil pattern, and between the second lead-out portion and the second coil pattern.

21. The coil component of claim 19, wherein the coil unit includes a seed layer contacting the substrate and an electrolytic plating layer disposed on the seed layer.

22. The coil component of claim 21, wherein a side surface of the seed layer is in contact with the insulating film.

23. The coil component of claim 21, wherein the via includes the seed layer disposed on a side surface of the substrate and the electrolytic plating layer disposed on the seed layer.

24. The coil component of claim 14, further comprising a via hole, wherein the via is disposed in the via hole, and as viewed from a plan view of the coil component, an entirety of an end portion of the connection portion overlaps the via hole.

25. A coil component comprising:

a body including a magnetic material;

a substrate disposed in the body; and a coil unit including first and second coil patterns disposed on both surfaces of the substrate, respectively, first and second via pads connected to inner ends of the first and second coil patterns, respectively, the first and second via pads include connection portions extending from innermost ends of the first and second coil patterns, respectively, in a direction toward the center of the first and second coil patterns, and wing portions protruding from both side surfaces of the connection portions, and a via connecting the first and second via pads to each other, wherein each of the wing portions has substantially the same or smaller line width than each of the first and second coil patterns, the line width of each of the wing portions is along a direction from the innermost ends of the first and second coil patterns toward the center of the first and second coil patterns, and the connection portion of the first via pad and the wing portion of the first via pad intersect each other in an inverted T-shape.

26. The coil component of claim 25, further comprising first and second external electrodes disposed to be spaced apart from each other on the body, while respectively being connected to the coil unit.

27. The coil component of claim 25, wherein each of the connection portions has substantially the same or smaller line width than each of the first and second coil patterns.

28. The coil component of claim 25, wherein a length L1 of each of the connection portions is more than 1 μm and less than 78 μm.

* * * * *